US005218859A

United States Patent [19]

Stenstrom et al.

[11] Patent Number: 5,218,859

[45] Date of Patent: Jun. 15, 1993

[54] METHOD AND APPARATUS FOR MONITORING A CONDUIT SYSTEM FOR AN INCOMPRESSIBLE FLUID FOR LEAKS

[75] Inventors: Theiss Stenstrom; Jens J. Molbaek, both of Nordborg; Poul E. Hyldig, Augustenborg; Bjarne Straede, Sydals; Lars J. Nielsen, Sonderborg, all of Denmark

[73] Assignee: Danfoss A/S, Nordborg, Denmark

[21] Appl. No.: 735,764

[22] Filed: Jul. 29, 1991

Related U.S. Application Data

[63] Continuation of Ser. No. 478,431, Feb. 12, 1990, abandoned.

[30] Foreign Application Priority Data

Feb. 15, 1989 [DE] Fed. Rep. of Germany ....... 3904487

[51] Int. Cl.[5] .............................................. G01M 3/08

[52] U.S. Cl. .............................................. 73/40.5 R

[58] Field of Search ...................... 73/40, 40.5 R, 49.2; 340/605

[56] References Cited

U.S. PATENT DOCUMENTS

| | | | |
|---|---|---|---|
| 3,344,667 | 10/1967 | Maltby | 73/113 X |
| 3,793,876 | 2/1974 | Oswald | 73/49.2 R |
| 3,978,709 | 9/1976 | Ando | 73/40.5 R |
| 4,043,355 | 8/1977 | Cerutti et al. | 73/40.5 R |
| 4,088,987 | 5/1978 | Resler et al. | 340/242 |
| 4,157,656 | 6/1979 | Walle | 73/49.2 R |

*Primary Examiner*—Jerry W. Myracle

*Attorney, Agent, or Firm*—Wayne B. Easton; Clayton R. Johnson

[57] ABSTRACT

The procedure for monitoring leakage of incompressible fluid includes introducing a predetermined volume of testing fluid into a conduit system at a pressure about the same as that at the source of the pressurized fluid during a testing period when no fluid is being withdrawn from the conduit system and flow from the fluid source is blocked and measuring the time required for the predetermined volume to flow into the conduit system. The apparatus includes a cylinder connected in parallel with the main valve between the source and the conduit system, a movable wall in the cylinder to divide it into two chambers and a spring in the chamber for urging the wall from the conduit system side chamber together with control apparatus for sensing the volume of the last mentioned chamber decreasing to a preselected volume. The control apparatus also includes mechanism for opening and closing the main valve and monitors large and/or small leakage occurrences.

12 Claims, 1 Drawing Sheet

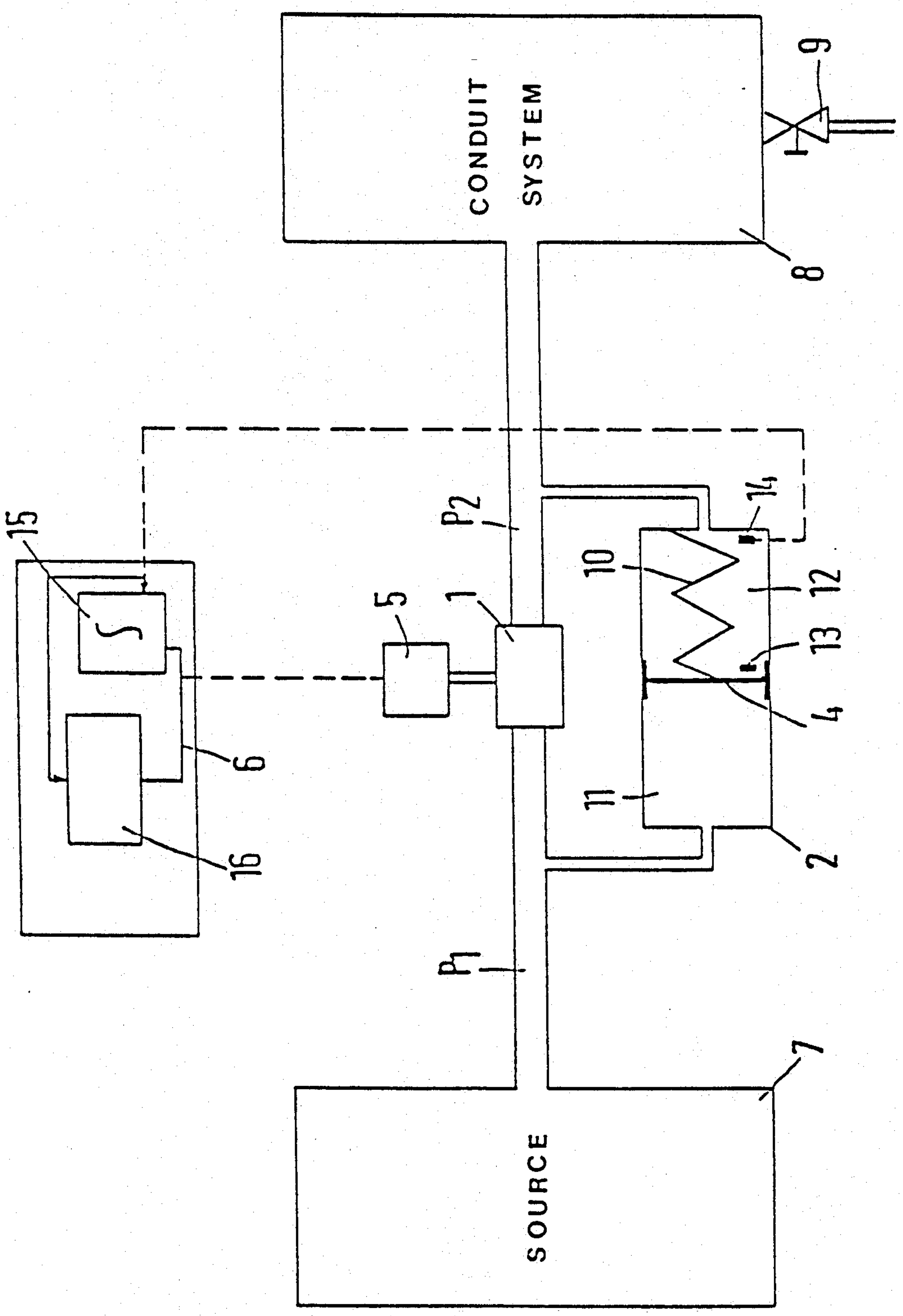
CONDUIT SYSTEM
SOURCE
P2
P1
1
2
4
5
6
7
8
9
10
11
12
13
14
15
16

METHOD AND APPARATUS FOR MONITORING A CONDUIT SYSTEM FOR AN INCOMPRESSIBLE FLUID FOR LEAKS

This is a continuation of application Ser. No. 478,431 filed Feb. 12, 1990, now abandoned.

The invention relates to a method of monitoring a conduit system for an incompressible fluid for leaks, wherein a testing fluid is introduced into the conduit system during a testing period when no fluid is being withdrawn from the conduit system and the conduit system is closed on the supply side by a main valve. The invention also relates to an apparatus for monitoring a conduit system for an incompressible fluid, comprising a main valve on the supply side of the conduit system and control apparatus for controlling actuation of the main valve.

Fluid conduit systems have to be monitored for untight joints and leaks. This applies fundamentally to all conduit systems, regardless of whether they are employed to convey mains water into a house, heating liquids in heating and remote heating systems or gases or fuels in distribution circuits.

The monitoring of mains water in buildings has particularly increased in importance in recent years. The problem will be explained by using the example of a mains water installation in a residential building. Normally, the consumption of water through withdrawal by a consumer from a water tap amounts to between about 50 and 1,500 l/h. In extreme cases, for example toilet cisterns or washing machines, the consumption could be between 30 and 2,500 l/h. Leakages accounted for by a pipe fracture or by bursting of a supply hose for a washing machine or dishwasher (large leak) are typically in the range of 500 to 2,500 l/h, sometimes higher, and can therefore not be distinguished from normal consumption. For this reason, with such large volumes above a predetermined value the supply of water is interrupted after a predetermined withdrawal period regardless of whether a consumer is using the water or there is a large leak.

In contrast, there are faults hereinafter referred to as a "small leak". In this case, the loss of water is in the range about 1 to 25 l/h and could be caused by dripping water taps and overflowing toilet cisterns on the one hand and untight pipe connections, commencement of fatigue failure in pipes occasioned by corrosion, hairline fractures in pipes and vessels or similar damage in the conduit system on the other hand. Whereas the first set of examples may not be dangerous but only increase the costs of fresh water and drainage and place a demand on drinking water sources and thus on the environment, small leaks of the second kind could cause considerable damage. More particularly, the outflowing quantity of 1 to 25 l/h may appear very small but, over a prolonged period, walls or other parts of the building can become irrepairable as a result of being saturated with moisture. The resulting damage is often noticed too late because the dampness starts inside a wall and does not become visible until the whole wall is saturated. If one were to discover such a small leak at an early stage, it could be repaired in time.

To check a central heating system for leakages, WO 87/04520 discloses an arrangement consisting of two flow meters of the vane-wheel type in the supply and return conduits of the system. Both vane-wheels determine the total volume flowing through the heating system. If there is no leak, the two volumes must be the same. If there is a difference between the two volumes, a leak is suspected and the circuit is shut down by way of a motorised valve. However, since the volumetric flow meters are provided for the main flow, that is to say for large volumes, they are unable to detect small leakages below, say, 25 l/h with the required degree of accuracy.

WO 86/06457 discloses equipment for monitoring pressure conduits for leakage points, this equipment measuring the pressure in the conduit system downstream of the main valve and shutting the main valve down either when a large amount of fluid flows through the main valve for a prolonged period or, if the main valve is closed, the period required by the pressure to drop from a first pressure to a second pressure is shorter than a permitted time interval. However, since the pressure on the supply side of the main varies considerably, for example pressure fluctuations at the waterworks that might be in the order of 1.2 bar or as a result of sudden consumption in an adjoining conduit system where the pressure could drop by about 0.6 bar and, on termination of this consumption, rise about 0.4 bar above the normal waterworks pressure and because of the pressure drop across the main valve as a result of the consumption in the conduit system being monitored, only unsatisfactory results can be achieved with the pressure measurement disclosed in WO 86/06457.

In a known apparatus for monitoring installations for tightness (DE-OS 21 58 901), when no fluid is being withdrawn, a leak is detected by withdrawing compressible fluid from the source, for example the supply mains, upstream of the main valve, compressing it with a compressor, and feeding it into the conduit system downstream of the main valve. After reaching a test pressure, the compressor is shut off. One now controls whether the pressure loss does not exceed a predetermined value within a predetermined time. In a different embodiment, one checks whether the compressor can build up the required testing pressure during a predetermined running time. Since the volume conveyed by the compressor always depends on the pressure difference between the inlet and outlet of the compressor, it is practically impossible to come to any conclusion about the conveyed quantity if both of the pressures are not so monitored. The known equipment is therefore only suitable for determining whether there is a leak. One cannot say how large this leak might be. In addition, a separate drive is required for the compressor and this might lead to undesirable noise. After detecting a leak, the main valve is locked in the closed position but fluid can nevertheless penetrate into the conduit system by way of the compressor and continue to escape through the leak.

It is the problem of the invention to provide a method and apparatus with which even small leaks can be reliably detected.

This problem is solved in a method of the aforementioned kind in that, without the entry of testing fluid from the supply side of the main valve, a predetermined test volume of the testing fluid is introduced into the conduit system under pressure and the time required by the test volume to flow into the conduit system is measured.

During testing, exactly the same amount of fluid leaves through the leakage point as during normal operation. Since this escaping amount of fluid is immediately replenished, the volume of leakage flow can be measured exactly if one assumes that it does not fluctuate appreciably over a period of time. It is simply detected by dividing the known test volume, i.e. the replenished quantity, by the measured time. In addition, a constant pressure is maintained through replenishment of the testing fluid in the conduit system to be monitored, whereby a sufficient amount of fluid is immediately available upon commencement of consumption.

In one embodiment of the method, the pressure with which the test fluid is introduced into the conduit system is of the same order as the fluid pressure on the supply side of the main valve. In a known apparatus, an increase in pressure is required which might increase the leak caused by a weakness in the material. To detect a leak, no excess pressure is therefore applied but testing fluid is introduced into the conduit system under normal pressure. Since the normal pressure, i.e. the supply pressure of the mains, for example the water mains of a city, is applied to the leakage points when the main valve is open, replenishment of the testing volume under the same pressure can practically reproduce the escape of leakage fluid under normal conditions. Since excessive pressure is avoided, the conduit system to be monitored is not stressed any more intensively than during normal operation.

Preferably, the testing fluid is withdrawn from the conduit system before the testing period. For testing purposes, therefore, exactly the same fluid is employed as that which is normally distributed by the conduit system to be monitored. No special testing fluid has to be provided and this makes the method considerably cheaper. Accordingly, all of the testing fluid that is employed has also already passed through the main valve and any upstream metering clock so that no difficulties are encountered for example when accounting for the mains water consumption to the waterworks. Also, no additional filters or like equipment have to be provided for the testing fluid. Since the withdrawal of the testing fluid takes place immediately prior to the testing period, it is also practically impossible for any error to occur because of the time difference between withdrawal of the testing fluid and the testing period.

Advantageously, the test volume is less than 0.5 l. Even the largest test volume of 500 ccm is still relatively small; it only fills a cylinder of about 8 cm diameter and 10 cm high. This reduces the construction costs and very considerably reduces the space taken up by the testing apparatus. The smaller the test volume, the higher will be the time resolution.

Preferably, after the complete introduction of the testing fluid, further testing fluid with the test volume is withdrawn form the conduit system and held ready for renewed introduction into the conduit system. This makes continuous measurement of the leakage volume possible. The time taken for the leakage flow can thus be more efficiently monitored.

Preferably, the entire volume of the introduced testing fluid is determined by adding the individual volumes that were introduced. This not only gives an indication of the individual volume of leakage flow but also determines the quantity of the total discharged fluid as an additional criterion for consideration.

It is also advantageous for the leakage flow to be determined continuously. This enables rapid recognition of a change in the leakage behavior of the conduit system being monitored and hence suitable protective or countermeasures can be taken in good time.

Preferably, an alarm signal is produced when the entire volume exceeds a predetermined first value and/or when the flow of leakage volume lies between a first and a second value.

The alarm may be an optical or acoustic signal. To release the alarm, two criteria are therefore available, namely the entire volume that has escaped at the leakage point on the one hand and the actual leakage flow on the other hand. If the actual leakage flow lies below a certain limit, for example 1 l/h, the system is declared to be leakproof. With a flow of leakage volume between, for example, 1 l/h and 3 l/h, a small leak is assumed which, although it has to be monitored, will not cause much damage. With a flow of leakage volume between for example 3 l/h and 20 l/h, one assumes a large small leak which could give rise to serious damage. A small leak can, for example, be indicated immediately. However, it could also be indicated only when the amount discharged through the small leak has exceeded a predetermined first value.

Preferably, the supply of fluid to the conduit system is completely interrupted when the total volume exceeds a predetermined second value. Irrespective of the size of the leak, an escaped amount of water can present a grave danger to the building and therefore it is better to close the main valve completely in order to avoid further damage. Naturally, shutting down can also be made dependent on the actual flow of leakage volume.

In a preferred embodiment, the total volume is returned to zero when the flow of leakage volume has been reduced by a predetermined extent. For example, it can happen that the leak is caused by a dripping water tap which the user failed to close completely. When the user notices his mistake and closes the water tap, the leak will also disappear. In this case, it is sensible to correct the total volume that was assumed to escape into the wall from a faulty point in the conduit system. This will then enable one to work with realistic parameters during the next testing period.

In an apparatus of the aforementioned kind, the problem is solved in that the conduit system communicates with a chamber for introducing a testing fluid with a predetermined test volume, the volume of the chamber being variable between a predetermined first larger value and a predetermined second smaller value. The chamber communicates only with the conduit system and time measuring means are provided for measuring the time during which the chamber reduces in volume from the first value to the second value.

Thus, the chamber serves as a store for testing fluid withdrawn from the conduit system. Since the chamber can assume two terminal conditions, namely one with a larger volume and one with a smaller volume, during the time between these two conditions it must be the exact difference in volume that has flowed out of the chamber into the conduit system or out of the conduit system into the chamber. Since the chamber communicates only with the conduit system and not with the supply side of the main valve, everything flowing out of or into the chamber must also flow through the conduit system. Since flowing out of the chamber for testing purposes only takes place with the main valve closed and without any pressure increase in the conduit system, the chamber introduces exactly as much fluid into the conduit system as escapes from the conduit system through a leakage point. The time measuring means measure the time required by the testing fluid to flow into the conduit system. In other words, they measure the time required by a certain volume to flow out of the conduit system through the leakage point. This enables one to obtain an indication about the actual flow of leakage volume if one assumes that this flow is not subjected to marked variations in time.

Preferably, the chamber is closed on one side by a movable wall. The chamber is sealed at all sides with the exception of the aperture to the conduit system, the volume being changeable by the wall. The volume therefore changes linearly with the displacement of the wall which makes the evaluation simple.

Preferably, the wall is movable towards the smaller value of volume against the force of a spring. If the same pressures obtain on both sides of the wall, the spring will move the wall so that the chamber will assume its largest volume. The spring therefore assists resetting.

Preferably, on the side remote from the chamber, the movable wall is subjected to a force which is constant throughout the path of movement. Regardless of the displaced distance, therefore, always the same pressure will act on the wall and thus on the chamber if one disregards the counter-force of the spring which becomes more intensively compressed as the displacement increases. However, since the spring is relatively weak in relation to the force acting on the side of the wall remote from the chamber, the change in the counterforce of the spring may be disregarded.

With particular advantage, the side of the wall remote from the chamber communicates with the supply side of the main valve. Thus, the supply pressure of the source, for example of the mains water from the waterworks, acts on the chamber without establishing communication between the source and the conduit system that is being monitored, i.e. without enabling fluid to enter the conduit system by bypassing the main valve. In addition, no auxiliary energy is required. Instead, an available pressure is utilized. The pressure in the conduit system being monitored can become no higher than the supply pressure from the source and this avoids excessive stressing of the monitored conduit system during monitoring.

In a preferred embodiment, a sensor is provided which transmits a signal to the control apparatus when the volume of the chamber has reached the smaller value. This terminal position is, for example, required for the time measurement.

It is also preferred that the control apparatus will open the main valve in response to this signal. When the chamber volume has reached its smaller value, a pressure drop must have occurred in the conduit system. This pressure drop may be caused by consumption or by a leak. For consumption, the main valve must open so that the user can withdraw fluid from the conduit system. In the case of a leak, monitoring has to occur.

For monitoring a large leak, the time element preferably produces a command to close the main valve a predetermined time after the main valve was opened. Since the leakage monitoring system is unable to differentiate between consumption and a large leak, this measure ensures that only a maximum amount of fluid can leave the conduit system. A consumer who wishes to withdraw more fluid can give prior indication of this to the control apparatus or he will interrupt the consumption momentarily to make it known to the control apparatus that there is no large leak.

In a further preferred embodiment, the control apparatus comprises an integrator which integrates the volumes of fluid fed into the conduit system from the chamber. This enables a value to be available at all times that indicates the amount of leakage flow that has escaped up to that time.

It is also advantageous if the control apparatus locks the main valve in the closed position when the integrator has determined a total volume which lies above a predetermined value and/or the flow of volume exceeds a predetermined value. When the flow volume exceeds a predetermined value there will, as previously explained, be no fear of extensive damage even in the case of a small leak. Another criterion, which could also be combined with the first criterion, is the fact that a certain amount of leakage fluid has escaped altogether. This amount can be adapted to suit the conditions. Upon exceeding this predetermined leakage flow, however, the main valve should be closed to avoid extensive damage .

An example of the invention will now be described in conjunction with the drawing which is a diagrammatic representation of an apparatus for monitoring a conduit system for an incompressible fluid for leaks.

A conduit system 8, for example for mains water in a residential building, is fed by way of a main valve 1 from a source 7, for example the mains water from a waterworks. The main valve 1 is remote controlled by an actuating apparatus 5 which is operated by a control apparatus 6. When the main valve 1 is closed, no water can reach the conduit system 8 from the source 7. Parallel to the main valve 1 there is the actual leakage monitoring equipment. This consists of a cylinder 2 which is divided by a movable wall 4 into a pressure chamber 11 and a chamber 12. The pressure chamber 11 communicates with the supply side of the main valve 1. The chamber 12 communicates with the discharge side of the main valve 1, i.e. with the conduit system 8. The wall 4 seals the chamber 12 from the pressure chamber 11.

The wall 4 is movable in the cylinder 2 so that the volume of the chamber 12 is variable between a larger value at which the wall 4 abuts the left-hand end of the cylinder 2 and a smaller value at which the wall 4 abuts the right-hand end of the cylinder 2. The wall 4 is pressed towards the left-hand end of the cylinder 2 by the force of a spring 10.

It will now be assumed that the main valve 1 is open without water being withdrawn from the conduit system through a tap 9. No water therefore flows through the main valve 1 and there will be no pressure drop. The pressure $P_1$ on the supply side of the main valve and equal to the pressure of the source 7 is therefore equal to the pressure $P_2$ on the discharge side of the main valve, i.e. equal to the pressure in the conduit system 8. The pressure $P_1$ also obtains in the pressure chamber 11 whilst the pressure $P_2$ obtains in the chamber 12. Accordingly, the same pressures act on both sides of the wall 4. However, since the wall 4 is additionally subjected to the force of the spring 10 on the side facing the chamber 12, the wall 4 will be displaced towards the left-hand end of the cylinder 2. At the right-hand end of the cylinder 2, there is a sensor 14 which is activated by a generator 13 in the wall 4 when the wall 4 is at its right-hand terminal position, i.e. when the chamber 12 has assumed its smallest volume. When the wall 4 is pushed towards the left under the force of the spring 10, this is detected by the sensor and notified to the control apparatus 6. A time element now functions in the control apparatus 6 and, after a predetermined time, signals the valve actuator 5 to close the valve. If no fluid is being withdrawn from the conduit system 8, the pressure will remain constant there, i.e. the wall 4 remains in its left-hand terminal position.

However, if a small leak occurs, fluid will trickle from the conduit system 8 to the exterior thereby gradually reducing the pressure $P_2$ in the conduit system. Since the wall 4 is subjected to the pressure $P_1$ of the source obtaining in the pressure chamber 11, it will wander to the right, whereby the test volume of fluid located in the chamber 12 is replenished to the conduit system. After a certain time, which is measured by the time element 16, the wall 4 will reach its right-hand terminal position, which is detected by the sensor 14 which may be in the form of a reed relay. Since the test volume is known, the test volume and the time required by the test volume to flow into the conduit system 8 will enable one to calculate the flow of volume, i.e. the volume per unit time, that has escaped the conduit system 8 through the leakage point. Since the test volume enters the conduit system 8 without elevated pressure, no higher pressure loads will occur in the conduit system 8 than if the main valve 1 were to open and allow the pressure from the source 7 to pass directly into the conduit system 8.

When the sensor 14 has recorded the fact that the wall 4 is in its right-hand terminal position, the control apparatus 6 will give a signal to the valve actuator 5 for the main valve 1 to open again. The wall 4 will now be displaced to its left-hand terminal position again in the manner described above and the testing cycle will start afresh.

The control apparatus 6 comprises an integrator 15 which summates the number of cycles of the wall 4 and, since the test volume is known, thereby enables an indication to be obtained about how much fluid has escaped through the leak altogether.

Since the test volume is always again introduced into the conduit system it is possible to obtain a continuous indication about the actual flow of leakage volume. In addition, there is an indication of the leakage flow that has already escaped so that, with the aid of these two leakage loss criteria, an indicator can be reliably actuated and/or the main valve 1 can be closed. For example, an indicator is actuated when the leakage volume exceeds a first predetermined value, e.g. 1 l/h. When the leakage volume exceeds the predetermined first value, e.g. 60 l, and the escaped leakage volume exceeds a predetermined first value, an indication can likewise be given and the integrator 15 is returned to zero again. Naturally, the number of times for which the integrator is reset to zero can be limited so as to prevent an excessively large amount of leakage fluid to escape through the leak. For example, one can ensure that on the third occasion the integrator 15 is not reset to zero but the main valve 1 is locked in the closed condition.

If the leakage volume is larger than a predetermined second value, e.g. 3 l/h, the integrator is not reset to zero when reaching the predetermined first leakage value but only an indicator is actuated. Integration, i.e. summation of the individual test volumes, is continued. If the integrator 5 finds that an amount of leakage fluid has escaped that is larger than a predetermined second test volume, e.g. 180 l, the control apparatus 6 likewise locks the main valve 1 in the closed position. In addition, the main valve can likewise be locked in the closed position when the leakage volume exceeds a predetermined second value. Preferably, however, the closing criterion will also be made dependent on the previously escaped leakage volume, i.e. the amount of leakage fluid that has escaped.

The individual values for the flows of leakage volume can, as mentioned, for example be 1 l/h for the first value and 3 l/h for the second value. Below a value of 1 l/h, the conduit system is considered to be leakproof. Above 3 l/h, one defines a large small leak with which only a certain amount of fluid can pass before the main valve 1 is closed.

If a consumer wishes to withdraw water at the point 9 he may, for example, turn a water tap 9, whereby the pressure $P_2$ will suddenly drop in the conduit system. The wall 4 is very rapidly pushed to the right-hand terminal wall of the cylinder 1 under the pressure $P_1$, whereupon the main valve 1 opens. The water can now flow into the conduit system 8 from the source 7. The same will take place if there is a large leak, for example if a pipe breaks or there is a burst in the supply hose for a washing machine or dishwasher. To prevent too much water from escaping in such a case, the time element 16 will close the main valve 1 again a predetermined time after the pressure drop. This time is, for example, sufficient for filling a bath or having a generous shower, e.g. 15 minutes. Of course there are also cases in which the consumer will want to withdraw water throughout a longer period, e.g. to wash his car or water the garden. In this case, he can signal this to the control apparatus 6, for example by actuating a switch whereby the apparatus will fix the maximum withdrawal time for the next consumption to, say, two hours. For all subsequent consumer activities, however, the original time of, say, 15 minutes will apply. Another possibility is for the time element 16 to transmit an acoustical optical signal just before expiry of the predetermined period, whereupon the consumer can close the tapping point 9 momentarily. The pressure $P_2$ will thereupon rise to move the wall 4 to the left again. At the instant when the control apparatus 6 detects that the wall has left its right-hand terminal position, i.e. the volume of the chamber 12 has increased again, the maximum tapping time can start afresh. Such a pressure rise would be most unlikely in the case of a large leak. One therefore ensures that damage caused by a large leak will likewise be reliably kept relatively small.

We claim:

1. A method of monitoring a fluid system for an incompressible fluid for leakage wherein the fluid system includes a pressurized source of a first incompressible fluid, a conduit system containing the first incompressible fluid and a main valve connected between the source and the conduit system, the steps of closing the main valve, introducing a predetermined first volume of an incompressible testing fluid into the conduit system under pressure during a testing period while the main valve is closed, fluid flow between the source and conduit system is blocked, and no fluid is being withdrawn from the conduit system, and measuring the time required for the predetermined volume to enter into the conduit system for obtaining an indication of leakage, the test fluid being the first fluid withdrawn from the conduit system withdrawn prior to closing the valve, and that after the complete introduction of the first volume into the conduit system, a second test volume is withdrawn from the conduit system and held available for introduction into the conduit system for monitoring purposes.

2. A method according to claim 1, characterized in that the flow of leakage volume is determined continuously.

3. A method according to claim 1, characterized in repeating the introducing and measuring steps, and that the total volume of testing fluid introduced is determined by adding the individually introduced volumes.

4. Apparatus for monitoring leakage loss of an incompressible fluid, comprising a source of pressurized fluid, a conduit system, a main valve operable between an open and a closed conduit system, a main valve operable between an open and a closed condition, first means for fluidly connecting the main valve to the source, second means for fluidly connecting the main valve to the conduit system, a cylinder having a first end, and a second end, a movable wall in the cylinder for dividing the cylinder into a first chamber having the first end and a second chamber having the second end, third means for resiliently urging the movable wall away from the second end, fourth means for fluidly connecting the first chamber to the first means intermediate the main valve and the source, fifth means for fluidly connecting the second chamber to the second means intermediate the main valve and the conduit system, and control means for sensing the movement of the movable wall adjacent to the second end and thence operate the main valve to its open position.

5. A method of monitoring a fluid system for an incompressible fluid for leakage wherein the fluid system includes a pressurized source of a first incompressible fluid, a conduit system containing the first incompressible fluid and a main valve connected between the source and the conduit system for controlling the flow of the first fluid from the source to the conduit system, the steps of closing the main valve for a testing period, withdrawing a predetermined first volume of fluid from the conduit system immediately prior to the closing of the main valve, introducing the predetermined first volume of the fluid into the conduit system under pressure that is about the same as that at the source during a testing period while the main valve is closed and no fluid is being withdrawn from the conduit system, and measuring the time required for the predetermined volume to enter into the conduit system while the main valve is closed and no fluid is being withdrawn from the conduit system for ascertaining the volume of leakage flow.

6. Apparatus for monitoring a fluid system for an incompressible fluid for leakage, comprising a pressurized source of a first incompressible fluid, a conduit system containing the first incompressible fluid, a closable main valve connected between the source and the conduit system for controlling the flow of fluid from the source to the conduit system, first means fluidly connected to the conduit system adjacent to the main valve for defining a variable volume chamber that is reducable from a first volume to a second volume for releasably containing a volume of testing fluid that is released into the conduit system as fluid leaks from the conduit system when the main valve is closed, and second means for measuring the time during which the chamber is reduced from the first volume to the second volume while the main valve is closed, the variable volume chamber being in fluid communication with only the conduit system, the second means including an integrator for integrating the fluid test volumes fed into the conduit system from the chamber.

7. Apparatus according to claim 6, characterized in that the second means includes control means for locking the main valve in a closed position when the integrator has detected a total volume that is above a predetermined value.

8. Apparatus according to claim 6, characterized in that the second means includes a sensor for sensing the volume of the chamber when the volume of the chamber has decreased to a predetermined lower value.

9. Apparatus for monitoring a fluid system for an incompressible fluid for leakage, comprising a pressurized source of a first incompressible fluid, a conduit system containing the first incompressible fluid, a closable main valve connected between the source and the conduit system for controlling the flow of fluid from the source to the conduit system, first means fluidly connected to the conduit system adjacent to the main valve for defining a variable volume chamber that is reducible from a first volume to a second volume for releasably containing a volume of testing fluid that is released into the conduit system as fluid leaks from the conduit system when the main valve is closed, and second means for measuring the time during which the chamber is reduced from the first volume to the second volume while the main valve is closed, the second means including a time element for sending a command to the close the main valve a predetermined time after opening the main valve, the variable volume chamber being in fluid communication with only the conduit system.

10. Apparatus for monitoring a fluid system for an incompressible fluid for leakage, comprising a pressurized source of a first incompressible flüid, a conduit system containing the first incompressible fluid, a closable main valve connected between the source and the conduit system for controlling the flow of fluid from the source to the conduit system, first means fluidly connected to the conduit system adjacent to the main valve for defining a variable volume chamber that is reducible from a first volume to a second volume for releasably containing a volume of testing fluid that is released into the conduit system as fluid leaks from the conduit system when the main valve is closed, the first means including a cylinder having a first end and a second end and a movable wall in the cylinder for dividing the cylinder into a chamber and a second chamber, the second chamber defining the variable volume chamber, and a spring in the variable chamber for resiliently urging the movable wall in a direction to enlarge the second chamber, second means for measuring the time during which the second chamber is reduced from the first volume to the second volume while the main valve is closed, the variable volume chamber being in fluid communication with only the conduit system.

11. Apparatus according to claim 10, characterized in that the first means includes means fluidly connecting the first chamber to the source.

12. Apparatus for monitoring a fluid system for an incompressible fluid for leakage, comprising a pressurized source of a first incompressible fluid, a conduit system containing the first incompressible fluid, a closable main valve connected between the source and the conduit system for controlling the flow of fluid from the source to the conduit system, first means fluidly connected to the conduit system adjacent to the main valve for defining a variable volume chamber that is reducible from a first volume to a second volume for releasably containing a volume of testing fluid that is released into the conduit system as fluid leaks from the conduit system when the main valve is closed, and second means for measuring the time during which the chamber is reduced from the first volume to the second volume while the main valve is closed, the variable volume chamber being in fluid communication with only the conduit system, the second means including a sensor for sensing the volume of the chamber when the volume of the chamber has decreased to a predetermined lower value and means for opening the main valve when the sensor has sensed the predetermined lower value.

* * * * *